(No Model.)
E. H. SCOTT.
METHOD OF WELDING METAL WHEELS.
No. 478,643. Patented July 12, 1892.
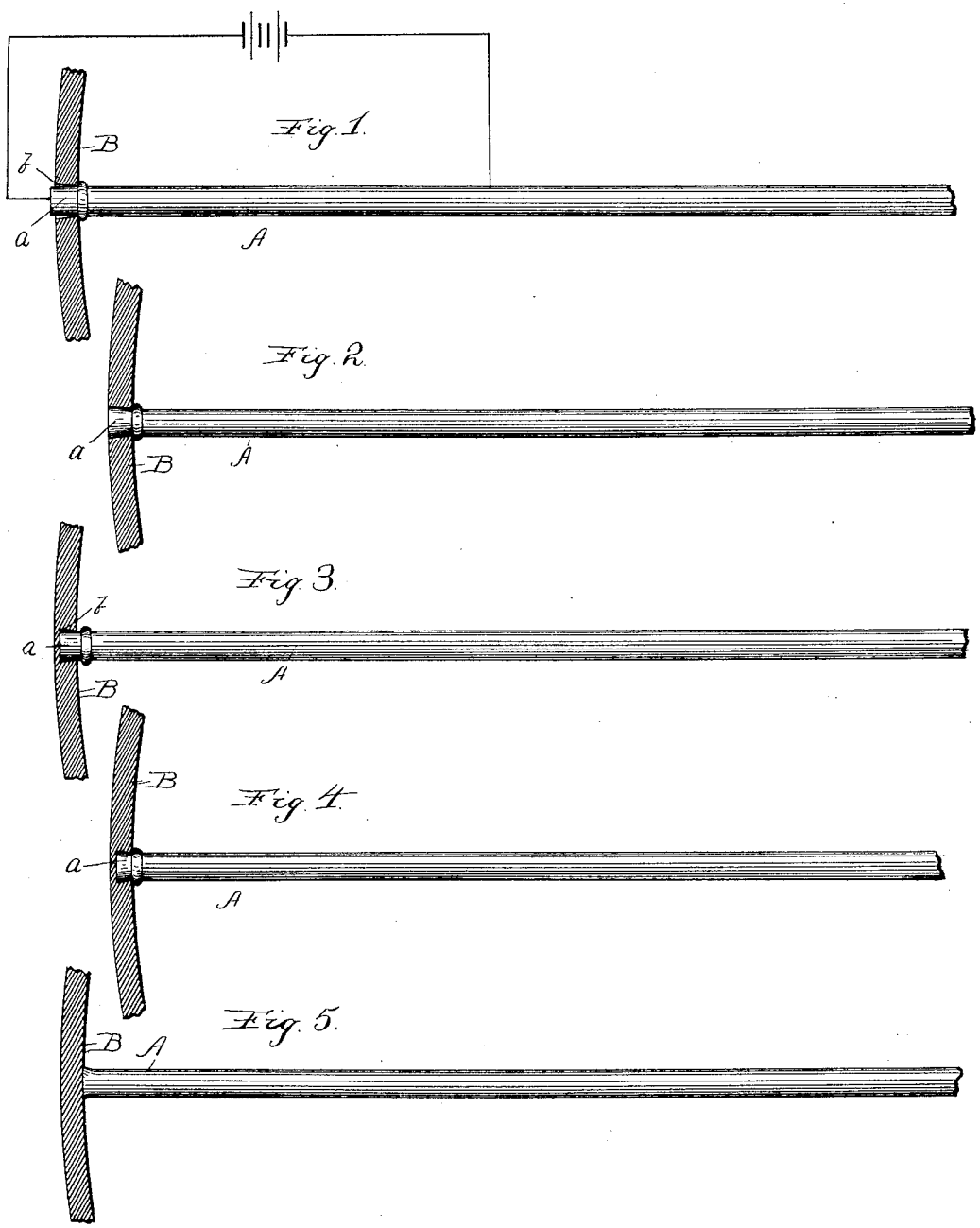

UNITED STATES PATENT OFFICE.

EMMET H. SCOTT, OF LA PORTE, INDIANA, ASSIGNOR TO THE NILES & SCOTT COMPANY, OF SAME PLACE.

METHOD OF WELDING METAL WHEELS.

SPECIFICATION forming part of Letters Patent No. 478,643, dated July 12, 1892.

Application filed January 28, 1889. Serial No. 297,781. (No model.)

*To all whom it may concern:*

Be it known that I, EMMET H. SCOTT, a citizen of the United States, residing in La Porte, in the county of La Porte and State of Indiana, have invented a new and useful Improvement in the Art of Manufacturing Metal Wheels, of which the following is a specification.

My invention relates to the art of securing spokes in the rim or tire of metal wheels.

Heretofore the metal spokes provided with suitable shoulders have usually been inserted in holes punched or drilled in the metal rim of the wheel and then the projecting ends of the spokes upset or riveted to hold them in place, the riveting being done in the usual manner, without heating the end of the spoke, either by hand or by suitable machines well known to those skilled in the art—such, for example, as that shown and described in the patent to Bettendorf, No. 335,882. In this old process, the riveting being done cold and the spoke-holes being necessarily made entirely through the tire, the riveting operation tends to strain and fray the metal and weaken and injure the tire so that the tires are afterward liable to break or burst at the rivet or spoke hole. When the spokes are thus secured in the tire by cold-riveting, it is also found that they are more or less liable to work loose in the use of the wheel, and thus destroy the rigidity and strength of the wheel.

It is the object of my invention to provide a simple, cheap, and expeditious process of securing the metal spokes in or to the metal rim of the wheel, whereby a perfectly-rigid joint or union may be effected between each and every spoke and the rim, and whereby, also, if desired, the spokes may be secured to the rim with perfect rigidity without weakening the rim or by forming spoke-holes entirely through it.

My invention consists in heating the rim ends of the spokes after they are inserted in the tire by passing an electric current through the same, as is done in the well-known process of electric welding, and then, while the end of the spoke and the surrounding wall of the hole or cavity of the rim in which it fits are thus heated, riveting or welding the spoke and tire together. The end of the spoke and the immediate surrounding portion of the rim in which it fits may thus be readily heated to the fusing-point and securely welded together. The pressure for thus welding the parts together while thus heated may be applied in any suitable manner or by any suitable means, the force or pressure being exerted in the direction of the length of the spoke and radially to the tire.

In practicing my invention it is not essential that the cavity or recess in the rim for the spoke to fit in extend entirely through the rim, as the endwise pressure upon the spoke will cause its end to upset against or weld to the walls of the cavity, and thus be firmly fixed in or to the rim. It is preferable to thus heat the end of the spoke to the fusing or welding point, so that the metal of the spoke and rim will be welded together in one solid piece; but it is not necessary to raise the heat to the welding degree, as a less degree of heat will cause the ends of the spokes to be readily upset or riveted to the tire.

My invention may be used in the manufacture of any ordinary form of metal wheels familiar to those skilled in the art—as, for example, that shown in the patent to Seymour, No. 394,885, or in the patents to Bettendorf, Nos. 325,585, 374,575, and 386,572, or those shown in other patents of the United States heretofore granted.

Where a welding-heat is used in practicing my invention, it will not be found necessary to form any recess or cavity in the rim for the end of the spoke to fit in, as the square or flat end of the spoke may fit against the smooth inner periphery of the rim and be secured thereto simply by the welding.

The dynamo or generator for producing the electric current, as well as the devices for holding the parts together under pressure, employed in practicing my invention, are, or may be, similar to those in use in ordinary electric welding-machines now in use and well known to those skilled in the art.

In the accompanying drawings, which form a part of this specification, I have shown for a better explanation of my invention at Figure 1 a sectional view of the rim and spoke in position for riveting or upsetting when the end of the spoke is heated by the electric current, the end of the spoke being inserted in a hole extending through the rim. Fig. 2 is a similar view showing the same after riveting. Figs. 3 and 4 are similar views illustrating the invention when the spoke-cavity does not extend entirely through the rim, and Fig. 5 shows the rim without any recess or cavity for the end of the spoke, the same being secured in place simply by the welding.

In practicing the invention the rim end or tenon $a$ of the spoke A is first inserted in the hole or cavity $b$ of the metal rim B, and then an electric current is passed through the same, as is done in electric-welding machines, until the end of the spoke is heated—for example, to a red heat—and then the end of the spoke is upset or riveted in the usual manner by applying pressure or blows thereto, either by hand or by a suitable riveting-machine such as are now commonly in use. Where the spoke-cavity does not extend entirely through the rim, as in Figs. 3 and 4, the riveting or upsetting is done by simply forcing the spoke endwise into the cavity. Ordinarily I prefer to heat the end of the spoke to a welding heat, so that the spoke will be welded or united integrally with the rim.

If the welding heat is used in the form shown in Fig. 1, the end of the spoke being welded in the hole or recess formed in the tire, it will serve to render the rim or tire as strong at this point as it was originally before the spoke-hole was formed therein. If the parts, however, are not raised to a welding heat by the electric current, the heat will, nevertheless, not only facilitate the riveting or upsetting operation, but it will also prevent injury to the rim by the riveting operation.

I claim—

1. The process of securing metal spokes in the rims of metal wheels, consisting in, first, inserting the spokes in place in the rim, and, secondly, heating the end of the spoke by an electric current, and, finally, riveting or upsetting the end of the spoke and securing it to the tire, substantially as specified.

2. The process of securing metal spokes in the rims of metal wheels, consisting in first putting the spoke in place within the rim, then heating the end of the spoke in contact with the rim to a welding heat and holding the rim and the spoke together under pressure, and thus welding them together, substantially as specified.

3. The process of securing metal spokes in the rims of metal wheels, consisting in, first, inserting the spokes in place in the rim; secondly, heating the ends of the spokes and the contiguous portion of the metal rim, and, finally, subjecting the same to force or pressure and welding or uniting the spokes and rim together, substantially as specified.

4. The improvement in the art of attaching metal spokes to metal wheel-tires, consisting in introducing the end of the spoke into the other member, heating the contiguous portion of the two members to a welding temperature by directing an electric current therethrough, and finally upsetting the spokes to complete the welding operation.

5. The improvement in the art of manufacturing metal wheels, which consists in passing the end of the spoke through a hole in the tire, directing an electric current through the contiguous portions of said parts, and thereby raising their temperature to a welding heat, and finally upsetting the end of the spoke, and thereby welding the parts together.

EMMET H. SCOTT.

Witnesses:
J. VENE DORLAND,
WILLIAM TYRRELL.